United States Patent Office 3,681,291
Patented Aug. 1, 1972

3,681,291
LIQUID CASTABLE ELASTOMERS
Obaidur Rahman Khan, Center Harbor, N.H., assignor to McCord Corporation, Detroit, Mich.
No Drawing. Filed Apr. 27, 1970, Ser. No. 32,395
The portion of the term of the patent subsequent to Apr. 20, 1988, has been disclaimed
Int. Cl. C08g 22/06
U.S. Cl. 260—77.5 AQ                5 Claims

ABSTRACT OF THE DISCLOSURE

A liquid castable urethane composition consisting of the reaction product of (I) a prepolymer obtained by reacting a diisocyanate with a polyoxypropylene or a polytetramethylene ether diol or triol or a caprolactone polyol or any combination thereof with (II) a new and novel curing system comprising (a) a polyoxypropylene glycol or polytetramethylene ether diol having a molecular weight of from about 500 to about 3000 or a polyoxypropylene of tetramethylene type triol having the same equivalent weight range; (b) an aromatic diol, (c) an aromatic amine corresponding to the formula

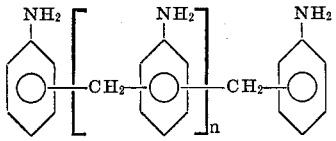

wherein $n$ represents a value between 0.1 and 0.3 and (d) an organometallic catalyst.

BACKGROUND OF THE INVENTION

This invention relates to novel and improved liquid castable polyurethane elastomers that are processed in the fluid state and at room temperature. Since the commercial introduction of liquid castable polyurethane elastomers in the early 1950's, considerable effort has been expended on the production of elastomers using polyesters and polyethers. Where improved properties such as resistance to abrasion, tear, ozone, oil and various solvents are desired, polyurethane elastomers are rapidly replacing previously employed elastomers. While polyurethane elastomers exhibit the improved properties described above, prior to the present invention it has been necessary to process them under stringent degassing and temperature conditions.

A majority of the commercially available urethane elastomers are produced by curing a polyester or polyether prepolymer with a diamine such as MOCA or 3,3'-dichlorobenzidene or a diol such as 1,4-butane diol. In preparing the known elastomers, the elastomer composition is prepared by mixing and reacting the prepolymer and curing agent at elevated temperatures generally ranging from 210° F. to 230° F. In order to obtain optimum properties, the prepolymer is heated from 210° F. to 220° F., degassed under vacuum to remove any dissolved air and then mixed with the curing agent at the elevated temperatures and under reduced pressure. The mixed elastomer is then processed using special equipment in order to maintain the desired temperatures and prevent the entrapment of air and other gasses in the elastomer composition. Following the molding the desired product, a long period of post cure at elevated temperatures, generally from about 2 to 12 hours at from 200 to 250° F. is required. In some cases, the post cure period is considerably longer.

The new and novel elastomer compositions of the present invention feature a unique curing system which enables the elastomer composition to be processed at room temperatures with rapid cure. The components of the elastomer composition, that is, the prepolymer and unique curing system, are mixed and poured into a mold at room temperature. The urethane elastomer products produced from the new elastomer compositions require no oven cure and the products generally can be demolded after a 5 to 20 minute molding cycle. A long post cure cycle following demolding is not required. Thus, the new elastomer compositions are unlike known elastomer systems. Furthermore, because the new elastomer system does not require stringent processing conditions, the special equipment required to affect high temperature cure, vacuum degassing and long post cure is not needed. In addition, the cost of materials employed to produce the new elastomer compositions is considerably less than the cost of commercially available elastomer systems. This lower cost of materials when coupled with the savings resulting from lower fabricating costs due to less stringent processing requirements makes the elastomer compositions of the present invention very attractive commercially.

It is an object of the present invention to provide an elastomer which can be mixed at room temperature and cured in the mold at room temperature.

It is a further object of the present invention to provide an elastomer composition which does not require a long mold cure cycle or long post cure cycle at elevated temperatures outside the mold.

GENERAL DESCRIPTION OF THE INVENTION

The novel composition of the present invention is the reaction product of (I) a prepolymer obtained by reacting a diisocyanate with a polyoxypropylene or a polytetramethylene ether diol or triol or a caprolactone polyol or any combination thereof with (II) a new and novel curing system comprising (a) a polyoxypropylene glycol or polytetramethylene ether diol having a molecular weight of from about 500 to about 3000 or a polyoxypropylene or tetramethylene type triol having the same equivalent weight range; (b) an aromatic diol; (c) an aromatic amine and (d) an organometallic catalyst.

The diisocyanates to be employed in the present invention include toluene diisocyanate (80/20 or 60/40), diphenyl methane diisocyanate, 4,4'-diphenyl methane diisocyanate, dichlorodiphenyl methane diisocyanate, dimethyl diphenyl methane diisocyanate, dibenzyl diisocyanate and diphenyl ether diisocyanate. The diphenyl diisocyanates correspond to the formula

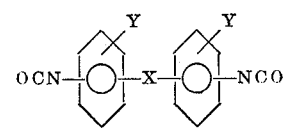

wherein X may be a valence bond or alkylene radical containing preferably 1 to 5 carbon atoms and Y represents a halo group such as chloro or bromo or an alkyl group having one or two carbon atoms. The isocyanate groups are preferably in the para position. Preferred diisocyanates are toluene diisocyanate and diphenyl methane diisocyanate.

The polyols, i.e., the polyoxypropylene or tetramethylene ether type diols or triols, used in the prepolymer and curing system are well known in the art and are prepared by the polymerization of propylene oxide and/or ethylene oxide and various initiators such as ethylene glycol, propylene glycol, 1,4-butane diol, trimethyl propane and the like to give polyols having primary and secondary hydroxyl groups. The polytetramethylene ether diol or triol is also prepared in accordance with known methods, for example, by the catalyzed polymerization of tetrahydrofuran. Caprolactone polyols can be also employed in the prepolymer. Representative caprolactone polyols are those having a molecular weight of about 500 to 2000 and are described in U.S. Pat. No. 3,169,945. The ratio of diisocyanate to polyol is not critical as long as the prepolymer has a free NCO content of from about 3 to about 12 percent. In a prepolymer wherein the free NCO content is greater than about 12 percent, the free NCO content of the prepolymer is so high that upon the addition of the catalyst system the formulation gels so rapidly that the formulation cannot be handled in ordinary processing equipment. Where the free NCO content is less than about 3 percent, a high molecular weight, highly viscous prepolymer is obtained that gels rapidly when admixed with the curing system, thus making prepolymers having a free NCO content of less than about 3 percent difficult to process.

The curing system of the present invention differs significantly from the curing agents employed in conventional liquid castable elastomers. In the conventional elastomer system, MOCA [4,4'-methylenebis(2-chloroaniline)] or a diol such as 1,4-butane diol generally serves as the only curing agent. The curing agent system of the present invention is comprised of (a) a 1000 to 2000 molecular weight polyol of the polyoxypropylene or tetramethylene ether type diol or triol having an equivalent weight in the same range, (b) an aromatic diol, (c) an aromatic amine and (d) an organometallic catalyst. The polyols are as previously described and are well known in the art.

The aromatic diol component of the catalyst system is the reaction product of an alkylene oxide or mixture thereof and a dihydric phenol. The dihydric phenol is characterized by having the hydroxyl groups in different aromatic nuclei and these nuclei connected by chain composed of 1 or more carbon atoms as in 4,4'-methylenebisphenol. The aromatic nuclei may contain additional substituents such as alkyl, alkoxy, halogen, nitro, dialkylamino and the like. The additional substituents preferably are free from active hydrogen containing groups as such groups may react with isocyanate and thus they alter the structure and properties of the resulting polymeric product. The dihydric phenols are in general known compounds and can be prepared by conventional procedures. The following compounds are typical of the dihydric phenols useful in this connection: 4,4'-methylenebisphenol; 4,4'-isopropylidenediphenol; 4,4'-isopropylidenebis(3,5-dichlorophenol); 4,4'-isopropylidenebis(3,3'-dibromophenol); 4,4'-isopropylidenedi-o-cresol and 4,4'-ethylenebisphenol. Mixtures of these and other equivalent dihydric phenols are contemplated in the present invention. The preferred dihydric phenol is the well known and readily available 4,4'-isopropylidenediphenol, commonly known as "bisphenol A." The dihydric phenols are reacted with an alkylene oxide such as ethylene oxide or propylene oxide in a known manner to convert the phenolic hydroxyl groups to aliphatic hydroxyl groups. The aromatic diols correspond to the formula

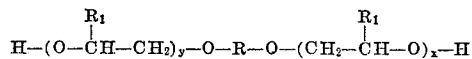

wherein R is the residue of an aromatic diol compound as herein defined; $R_1$ is hydogen or methyl and $x$ and $y$ are independently selected from the group of integers 1, 2, 3 or 4. Good results are obtained using an aromatic diol derived from the reaction of 4,4'-isopropylidenediphenol and propylene oxide and having a molecular weight in the range of from about 400 to 600.

The aromatic amine to be used in the present invention is selected from the group of aromatic amines corresponding to the formula

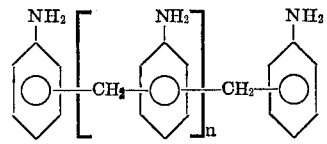

wherein $n$ represents a value between 0.1 to 0.3. As will be manifest, therefore, the said aromatic amine is predominantly the dimer however there is sufficient of the higher polymers present that the value of $n$ is as aforesaid. The aromatic amine is employed in an amount sufficient to provide an $NH_2/OH$ ratio of from about 0.2 to about 0.9 for the total elastomer composition. When the $NH_2/OH$ ratio is materially greater than 0.9 a very fast reacting system which is very difficult to handle in existing processing equipment is obtained. The use of the aromatic amine in an amount sufficient to produce an $NH_2/OH$ ratio of less than about 0.2 results in a deterioration in the physical properties of the elastomer and significantly increases the pot life of the elastomer system. Optimum physical properties are obtained when the amount of aromatic amine is sufficient to produce an $NH_2/OH$ ratio of about 0.7.

In producing the curing system the order of contacting the various constituents is not generally critical. However, the organometallic catalyst such as stannous octotate, lead octoate, dibutyltin dilaurate, calcium octoate and zinc octoate should be dissolved in a polyol prior to the addition of the aromatic amine in order to obtain a homogeneous mixture. In a convenient procedure, the curing system is prepared by dissolving the organometallic compound in a portion of the polyol component of the catalyst system. Thereafter, the aromatic diol is added, with stirring, to the solution of organometallic compound in the polyol. At this point standard urethane adjuvants such as pigments, fillers, flowing agents, other resins, ultraviolet absorbers or other like adjuvants can be added to the curing system.

In producing the unique elastomeric compounds, the prepolymer and curing system are conveniently mixed together at a temperature of from 70° F. using standard urethane foam type mixing and processing equipment. However, in those cases where an $NH_2/OH$ ratio of the formulation is less than about 0.7, the prepolymer and curing systems can be admixed at a temperature of from 90° to 100° F. without causing premature gelling or an undesirable increase in viscosity. During the short period between the time the prepolymer and curing system are mixed and mixed formulation is added to the mold, the elastomer composition is usually maintained at a temperature of from 70° to 85° F. in order to allow reasonable processing time. If the temperature of the elastomer composition is above 100° F., the reaction proceeds so rapidly that it is very difficult to process the elastomer.

Products exhibiting good physical properties are obtained by simply mixing the prepolymer and catalyst systems in a standard urethane foam mixing and metering unit and dispensing the mixed elastomer formulation into the mold. The liquid elastomer formulation can also be mixed and dispensed in standard castable elastomer mixing and metering equipment; however, the high temperature mixing cycle used for other castable elastomers should not be employed as the formulations of the present invention gel very rapidly at high temperatures. The liquid elastomer system should be molded within 30 seconds to 5 minutes after the prepolymer and catalyst systems are mixed.

The molds used to produce shaped articles from the castable liquid elastomers of the present invention can be fabricated from the suitable materials such as aluminum, epoxy resin, nickel, copper-nickel and the like. When molding the unique formulations of the present invention, unlike molding known liquid castable elastomers, the foam formulation is metered into a room temperature mold. Other liquid castable elastomers require the use of a heated mold. A mold heated to from 65° to 150° F. at the time the liquid elastomer formulation is added can be employed in processing the present invention; however, it is not necessary to heat the molds above room temperature. Following the addition of the formulation to the mold, the mold is closed and the formulation cured to produce the desired molded article or shape.

Molding times of from five to ten minutes are conveniently employed when using room temperature molds. Shorter molding cycles, e.g., two minutes, can be employed if the molds are heated. Longer molding cycles can also be employed if desired without having any deleterious affect on the molded product. A post cure period following demolding of the molded part is not required; however, a post cure of from one-half hour to one hour at temperatures up to about 250° F. conveniently can be employed.

The unique liquid castable elastomer formulations of the present invention can be employed to produce motor mounts, vibration dampers, oil seals, gaskets, fuel hose, machine pads and the like.

SPECIFIC EMBODIMENTS

The following examples are merely illustrative and are not deemed to be limiting.

Example 1

In a prepolymer system the prepolymer is prepared as follows by mixing the following constituents in the order as given.

| Components: | Parts |
|---|---|
| Polyoxypropylene glycol (secondary OH capped diol) having an average molecular weight of about 1000 | 48.00 |
| Toluene diisocyanate (80/20 mixture) | 20.20 |
| Benzoyl chloride | 0.10 |
| Free NCO (percent) | 8.0 |

The catalyst is prepared by mixing together the following components in the order as given. The order of mixing is not important except that the organometallic catalyst is to be dissolved in a polyol prior to the addition of the aromatic amine.

| Components: | Parts |
|---|---|
| Polyoxypropylene glycol (secondary OH capped diol) having an average molecular weight of about 2000 | 20.00 |
| Stannous octoate (20%) dispersed in dioctyl phthalate | 3.5 |
| Aromatic amine [1] | 9.3 |
| Aromatic diol (an adduct of bisphenol A and propylene oxide having a molecular weight of 537 and a hydroxyl number of 209) | 3.1 |
| Carbon black (20%) dispersed in same polyoxypropylene glycol as employed in the prepolymer | 1.2 |
| TDI Index | 105.0 |
| NH$_2$/OH | 0.7 |

[1] The aromatic amine has a structure corresponding to the formula in col. 4 wherein $n=0.3$, said amine having an equivalent weight of 103 and a functionality of 2.3.

The catalyst and prepolymer were mixed together at room temperature in a standard urethane foam machine and the formulation poured into an epoxy mold. Following the addition of the urethane composition to the mold, the mold is closed and maintained at room temperature for about 5 minutes. Following the foaming period, the foamed material is removed, post cured for 1 hour at 180° F. and thereafter tested for density, tensile strength, tear elongation, compression set, compression, deflection and flex modulus. The physical properties observed are recorded in Table I.

Example 2

Following the method set forth in Example 1, the following liquid elastomer system was prepared.

| Components: | Parts |
|---|---|
| Prepolymer— | |
| Polyoxypropylene glycol (secondary OH capped diol) having an average molecular weight of about 1000 | 51.3 |
| Toluene diisocyanate (80/20 mixture) | 20.2 |
| Benzoyl chloride | 0.1 |
| Free NCO (percent) | 7.9 |
| Catalyst— | |
| Polyoxypropylene glycol (secondary OH capped diol) having an average molecular weight of about 2000 | 20.0 |
| Aromatic diol (same as in Example 1) | 3.1 |
| Aromatic amine (same as in Example 1) | 9.3 |
| Stannous octoate (20%) dispersed in dioctyl phthalate | 3.5 |
| Carbon black (20%) dispersed in same polyoxypropylene glycol employed in the prepolymer | 1.2 |
| TDI Index | 105.0 |
| NH$_2$/OH | 0.7 |

The materials were mixed at room temperature. The mold temperature at the time of addition was room temperature. Following the addition of the urethane composition to the mold, the mold is closed and maintained at the same temperature for 5 minutes. Following the molding period, the product was removed, cured for one hour at 180° F. and the physical properties of the cured material measured and set forth in Table I.

Example 3

In other examples, the following formulations were hand mixed, molded and tested as described in Example 1. The test results for these various formulations are set forth in Table I.

| Formulation | A | B | C | D | E |
|---|---|---|---|---|---|
| Catalyst, part by weight: | | | | | |
| Polyoxypropylene glycol having an average molecular weight of about 1,000 | | | | 24.2 | |
| Polytetramthylene ether glycol having an average molecular weight of about 2,000 | | | | | |
| Polyoxypropylene glycol having an average molecular weight of about 2,000 | 31.55 | | 36.0 | | 40.9 |
| Aromatic diol (same as in Example 1) | | | 7.02 | 9.4 | |
| N,N-di(2-hydroxypropyl) aniline | 1.26 | 1.26 | | | 1.26 |
| Aromatic amine (same as in Example 1) | 9.29 | 9.29 | 6.0 | 4.0 | 10.6 |
| C-7 stannous octoate (20%) dispersed in dioctyl phthalate | 3.5 | 3.5 | 4.0 | 4.0 | 5.0 |
| Trichlorofluoromethane | 10.0 | 10.0 | | | 3.0 |
| Triol having average molecular weight of about 3,000 [1] | | 31.2 | | | |
| Carbon black (20%) dispersed in same polyol used in catalyst | | | 1.2 | 1.2 | |
| NH$_2$/OH | 0.7 | 0.7 | 0.36 | 0.22 | 0.80 |
| TDI Index | 105.0 | 105.0 | 106.0 | 106.0 | 105.0 |

[1] A secondary OH capped polyether triol of propylene oxide having an average molecular weight of about 3,000 and a hydroxy number in the range of from 54.3 to 62.3.

|  | Prepolymer | | | | |
|---|---|---|---|---|---|
|  | A | B | C | D | E |
| Polytetramethylene ether glycol having an average molecular weight of about 2,000 | 85.5 | 85.5 | | | |
| Polyoxypropylene glycol having an average molecular weight of about 2,000 | | | | | 75.5 |
| Polyoxypropylene glycol having an average molecular weight of about 1,000 | | | 51.3 | 51.3 | |
| TDI 80/20 | 20.1 | 20.1 | 20.2 | 20.2 | 21.2 |
| Benzoyl chloride | 0.1 | 0.1 | 0.1 | 0.1 | 0.15 |
| Free NCO (percent) | 5.8 | 5.8 | 7.9 | 7.9 | 7.3 |

Example 4

A low density foam system was produced in accordance with the method described in Example 1 using the following formulations.

Prepolymer system:     Formulations in parts by weight

Polycaprolactone polyol [1] _____ 37.3
  Toluene diisocyanate (80/20) _____ 20.2
  Benzoyl chloride _____ 0.1
  Free NCO (percent) _____ 10.0

Catalyst system:
  Polyoxypropylene glycol having an average molecular weight of about 2000 _____ 30.0
  Aromatic diol (same as in Example 1) _____ 3.1
  Aromatic amine (same as in Example 1) ____ 9.3
  Stannous octoate (20%) dispersed in dioctyl phthalate _____ 3.5
  Carbon black dispersed in same polyoxypropylene glycol used as polyol in catalyst system _____ 1.2
  TDI Index _____ 105.0
  $NH_2/OH$ _____ 0.7

[1] A diol having an average molecular weight of 830, hydroxyl number of 135, acid number of 0.3 and melting range of from 35° to 45° C.

The prepolymer and catalyst systems were mixed at room temperatures and poured into an aluminum mold and maintained at room temperature for 5 minutes. Following the heating period, the product is removed from the mold, cured at room temperature for 24 hours and the properties tested. The properties are listed in Table I.

TABLE I.—PHYSICAL PROPERTIES

| Formulation from Example Nos.— | Density (No./ft.³) | Tensile (p.s.i.) | Tear (p.l.i.) | Elongation (percent) | C/S at 50 (percent) | C/D at 50 (percent) | Flex modulus (p.s.i.) |
|---|---|---|---|---|---|---|---|
| 1 | 64.0 | 2,090 | 332 | 340 | 45 | 2,320 | 2,990 |
| 2 | 63.3 | 1,500 | 281 | 365 | 62.5 | 1,540 | 1,550 |
| 3A | 50.8 | 875 | 365 | 200 | 64 | 488 | 430 |
| 3B | 50.0 | 1,025 | 225 | 284 | 70 | 896 | 1,450 |
| 3C | 56.6 | 600 | 300 | 180 | 22 | 630 | 500 |
| 3D | 51.0 | 550 | 400 | 120 | 37 | 350 | 250 |
| 3E | 54.0 | 680 | 280 | 180 | 42 | 520 | 800 |
| 4 | 59.8 | 1,575 | 370 | 210 | 36 | 3,815 | 5,400 |

What is claimed is:

1. A liquid castable urethane composition consisting essentially of a reaction product obtained by reacting, at a temperature of from about 70° to 100° F.
 (I) a prepolymer obtained by reacting a diisocyanate with a polyol selected from the group consisting of (A) the polyoxypropylene polyols, (B) the polytetramethylene ether polyols, (C) the caprolactone polyols, and (D) mixtures of any of (A), (B) and (C) with at least one other of (A), (B) and (C), the ratio of diisocyanate to polyol being such as to provide a free NCO content of from about 3% to 12% of such prepolymer,
 with:
 (II) a curing composition consisting essentially of:
  (a) a polyol having a molecular weight of from about 500 to about 3000 and selected from the group consisting of (A), (B) and mixtures thereof,
  (b) an aromatic diol consisting of a reaction product of an alkylene oxide and a dihydric phenol,
  (c) an aromatic amine corresponding to the formula

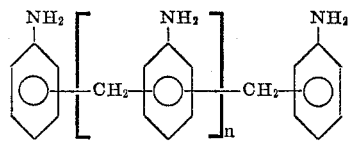

wherein $n$ represents a value between 0.1 and 0.3, the amount of said aromatic amine in said curing composition being sufficient to provide an $NH_2/OH$ ratio of from about 0.2 to about 0.9, and
  (d) an organometallic catalyst.

2. A liquid castable urethane composition as set forth in claim 1 wherein the diisocyanate corresponds to the formula

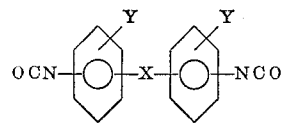

wherein X is a valence bond or an alkylene radical containing from 1 to 5 carbon atoms and wherein Y is selected from the group consisting of the halogens, the methyl radical and the ethyl radical.

3. A liquid castable urethane composition as set forth in claim 1 wherein the diisocyanate is toluene diisocyanate.

4. A liquid castable urethane composition as set forth in claim 1 wherein the aromatic diol is derived from the reaction of 4,4'-isopropylidene diphenol and propylene oxide.

5. A liquid castable urethane composition as set forth in claim 1 wherein the polyol in said curing composition has a molecular weight of from about 1000 to 2000.

References Cited

UNITED STATES PATENTS

| 3,265,669 | 8/1966 | Hirosawa | 260—77.5 |
| 3,503,927 | 3/1970 | Chang et al. | 260—47 |
| 3,457,225 | 7/1969 | Dasmusis | 260—77.5 |
| 2,955,056 | 10/1960 | Knox | 260—77.5 |
| 3,158,586 | 11/1964 | Krause | 260—77.5 |
| 2,917,489 | 12/1959 | Gladding et al. | 260—47 |
| 3,436,361 | 4/1969 | Wooster | 260—47 |
| 3,563,906 | 2/1971 | Hoeschele | 260—77.5 |
| 3,575,896 | 4/1971 | Khan | 260—2.5 |

DONALD E. CZAJA, Primary Examiner

E. C. RZUCIDLO, Assistant Examiner

U.S. Cl. X.R.

260—18 TN, 47 CB, 75 NQ, 77.5 AN, 77.5 AP